United States Patent
Okawa (10) Patent No.: US 7,406,889 B2
(45) Date of Patent: Aug. 5, 2008

(54) GEAR SELECTION POSITION DISPLAYING DEVICE

(75) Inventor: Yasushi Okawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 276 days.

(21) Appl. No.: 11/424,140

(22) Filed: Jun. 14, 2006

(65) Prior Publication Data

US 2006/0288812 A1 Dec. 28, 2006

(30) Foreign Application Priority Data

Jun. 15, 2005 (JP) .............................. 2005-174456

(51) Int. Cl.
*F16H 59/00* (2006.01)
*F16H 61/00* (2006.01)
*F16H 63/00* (2006.01)

(52) U.S. Cl. .................... 74/335; 74/473.18; 74/473.28

(58) Field of Classification Search .................. 74/335, 74/473.1, 473.12, 473.18, 473.21, 473.22, 74/473.23, 473.25, 473.28, 473.3, 473.33
See application file for complete search history.

(56) References Cited

U.S. PATENT DOCUMENTS 6,046,673 A * 4/2000 Michael et al. ............. 340/456

6,699,155 B2 * 3/2004 Nagasaka ..................... 477/94
2006/0053930 A1 * 3/2006 Morita et al. ............ 74/473.18
2006/0236800 A1 * 10/2006 Yone et al. ................ 74/336 R
2007/0017312 A1 * 1/2007 Yone ........................... 74/335

FOREIGN PATENT DOCUMENTS

| JP | 2002-264684 | 9/2002 |
| JP | 2003-327002 | 11/2003 |

\* cited by examiner

*Primary Examiner*—David D. Le
(74) *Attorney, Agent, or Firm*—Rankin, Hill & Clark LLP (57) ABSTRACT

A gear selection position displaying device includes a path display portion (56) which displays a movement path of a gearshift lever, lever position display portions (circled portions of 51c, 53b, 53c, 53d and 55b) which display the position of the gearshift lever, and gear range display portions (51a, 52a, 54a and 55a, and symbol imparted portions of 51c, 53b, 53c, 53d and 55b) which display gear ranges which are selected at the gear selection positions, respectively. When a momentary area where the gearshift lever is automatically restored to a home position is selected, a display on the gear range display portions (52a, 54a) which corresponds to the momentary area so selected is deleted (52b, 54b), whereas a gear range corresponding to the selected momentary area is displayed (53c, 53d) on the gear range display portions (53c, 53d).

9 Claims, 6 Drawing Sheets

GEAR SELECTION POSITION DISPLAYING DEVICE

The present invention claims foreign priority to Japanese patent application No. 2005-174456, filed on Jun. 15, 2005, the contents of which is incorporated herein by reference.

BACKGROUND OF THE INVENTION

1. Field of the Invention

The present invention relates to a gear selection position displaying device for use with a gearshift system of an automatic transmission and a vehicle equipped with the gear selection position displaying device. More particularly, the present invention relates to a gear selection position displaying device which can preferably be applied to a gearshift system which has a home position and a holding position for a gearshift lever, whereby when the gearshift lever is shifted to the holding position from the home position, the gearshift lever is returned to the home position in the event that a predetermined condition is satisfied.

2. Description of the Background Art

In recent years, as gearshift systems for automatic transmissions installed on motor vehicles, so-called shift-by-wire type gearshift systems attract attention which are advantageous in reduction in operating force as well as size of gearshift systems. In the shift-by-wire method, the gear selection position of a gearshift system is detected by a sensor or the like so that gear ranges of an automatic transmission are changed over by an actuator based on a detection signal. Namely, in the shift-by-wire method, since the gear ranges of the automatic transmission are made to be changed over through electric controls, the degree of freedom in designing operation modes of a gearshift lever is increased. For example, a so-called momentary function can be imparted in which when the driver removes his or her hand from the gearshift lever which has been shifted into a predetermined gear selection position, the gearshift lever is automatically restored to a home position.

Here, as an example of common selection gear ranges in an automatic transmission, there are raised neutral gear range, drive gear range, reverse gear range and low-drive gear range (low-gear). (Note that a park gear range is a gear range where the automatic transmission is locked, and hence, the park gear range is different from the selection gear ranges in the automatic transmission.) In this case, to match these selection gear ranges, formed in a gearshift system are such gear selection positions as neutral position, drive position, reverse position and low-gear position. In the shift-by-wire type gearshift systems, the momentary function can be provided for all the gear selection positions, whereby since the gearshift lever can be positioned in the same position at all times except when the gearshift lever is operated, improvement in operability of the gearshift lever in gearshift can be expected.

For example, in Japanese Patent Unexamined Publication No. JP-A-2002-264684, a gearshift system is disclosed in which when the driver removes his or her hand from the gearshift lever which has been shifted into a predetermined gear selection position, the gearshift lever is automatically restored to the home position. In the event of the gearshift system like this, when the driver removes his or her hands from the gearshift lever after he or she has operated the lever, a state occurs at all times in which the gearshift lever is returned to the home position. When the gearshift lever is constructed so as to be located in the same position like this, there is caused a problem where the driver has difficulty in realizing the current gear range which is currently selected in the automatic transmission.

To solve this problem, in Japanese Patent Unexamined Publication No. JP-A-2003-327002, a gearshift system is described in which a holding function to hold a gearshift lever is provided for reverse position and low-gear position of gear selection positions, while at the other gear selection positions, the gearshift lever is automatically restored to the home position. According to the gearshift system like this, the driver can confirm the current gear range in the automatic transmission from the sensation in the hand, thereby making it possible to realize a gearshift system which has superior operability.

Incidentally, in the gearshift system having the gearshift lever holding function which is described in JP-A-2003-327002, when the gearshift lever is in the home position, the gear range in the automatic transmission is in a manual mode where the gears in the automatic transmission are changed over through a gearshift operation by the driver. This leads to a problem where the driver cannot make sure which gear is actually selected in the automatic transmission from the gear selection position, either. To cope with this, a technology is disclosed in JP-A-2002-264684 in which the gear range that is currently selected in the automatic transmission is displayed by highlighting with emitted light of a symbol or number (for example, "R" for reverse gear range, "L" for low-gear gear range, "3" for third gear, and the like) within the instrument cluster.

In the event that the emitted light highlighted display like this is applied to the gearshift system described in JP-A-2003-327002, however, since the actual shift lever position in the gearshift system cannot be displayed in a corresponding fashion, the driver needs to look at and comprehend the display. This leading to a problem where a certain length of time is necessary to confirm the currently selected gear range and a sensation of physical disorder is generated.

In addition, in a vehicle equipped with an automatic transmission, for example, when the driver selects the reverse position in the gearshift system while the vehicle is running forwards at a predetermined speed, there occurs a case where an automatic transmission control unit, which controls the changeover of gear ranges in the automatic transmission, determines invalid the gearshift operation effected by the driver and the control unit prohibits the changeover of gear ranges. However there has been no means for allowing the driver to recognize in advance that the gearshift operation done by him or her has been overridden.

SUMMARY OF THE INVENTION

Consequently, a problem that the invention is to solve is how to provide a gear selection position displaying device which can display both a gear selection position in the gearshift system and a gear range selected in the automatic transmission at the same time. In addition, another problem that the invention is to solve is how to provide a gear selection position displaying device which allows the driver to recognize a gearshift operation that is determined invalid by the vehicle side.

With a view to solving the problems, according to a first aspect of the invention, there is provided a gear selection position displaying device for a gearshift system which selects any one of a plurality of gear ranges set in an automatic transmission by positioning a gearshift lever at respective gear selection positions and comprises a momentary area where the gearshift lever is automatically restored to a home position, the gear selection position displaying device comprising:

a path display portion which displays a movement path of the gearshift lever;

a lever position display portion which displays the position of the gearshift lever; and a plurality of gear range display portions displaying the respective gear ranges which are selected when the gear shift lever is positioned at the corresponding gear selection positions, respectively, wherein when the gear selection position located in the momentary area is selected, a display of the selected gear range, which corresponds to the gear selection position located in the momentary area, on the corresponding gear range display portion is deleted, and the selected gear range is displayed on the lever position.

According to the first aspect of the invention, a gear selection position in the gearshift system and a gear range selected in the automatic transmission can be displayed at the same time in an associated fashion.

In addition, with a view to solving the other problem, according to a second aspect of the invention, there is provided a gear selection position displaying device as set forth in the first aspect of the invention, wherein when there is an invalid gear shift operation which is determined under a predetermined condition, a display on the gear range display portion, which corresponds to the gear range which is made invalid, is deleted.

According to the second aspect of the invention, the driver is allowed to recognize in advance a gearshift operation that is determined invalid by the vehicle side by deleting a gear selection position display portion which corresponds to the gear range at which the gearshift operation which is determined invalid.

In addition, with a view to solving the problem, according to a third aspect of the invention, there is provided a gear selection position displaying device for a gearshift system which selects any one of a plurality of gear ranges set in an automatic transmission by positioning a gearshift lever at respective gear selection positions and comprises a momentary area where the gearshift lever is automatically restored to a home position, the gear selection position displaying device memorizing a plurality of gear selection position displays which correspond to the respective gear selection positions, and displaying one of the gear selection position displays which corresponds to the gear selection position which the driver has selected by the gearshift lever, wherein the plurality of the gear selection position displays comprising:

a path display portion which displays a movement path of the gearshift lever;

a lever position display portion which displays the position of the gearshift lever; and a plurality of gear range display portions displaying the respective gear ranges which are selected when the gear shift lever is positioned at the corresponding gear selection positions, respectively, wherein when the gear selection position located in the momentary area is selected, a display of the selected gear range, which corresponds to the gear selection position located in the momentary area, on the corresponding gear range display portion is deleted, and the selected gear range is displayed on the lever position.

According to the third aspect of the invention, a gear selection position in the gearshift system and a gear range selected in the automatic transmission can be displayed at the same time in an associated fashion.

With a view to solving the other problem, according to a fourth aspect of the invention, there is provided a gear selection position displaying device as set forth in the third aspect of the invention, wherein when there is an invalid gear shift operation which is determined under a predetermined condition, a display on the gear range display portion, which corresponds to the gear range which is made invalid, is deleted.

According to the fourth aspect of the invention, the driver is allowed to recognize in advance a gearshift operation that is determined invalid by the vehicle side by deleting a gear selection position display portion which corresponds to the gear range at which the gearshift operation which is determined invalid.

Furthermore, according to fifth and sixth aspects of the invention, there is provided a gear selection position displaying device as set forth in the second or fourth aspect of the invention, wherein the gear selection positions include a reverse position where the vehicle travels rearward, the predetermined condition is such that the vehicle is traveling forward at a predetermined speed or faster, and the gear range made invalid is a reverse gear range.

According to the fifth aspect of the invention, when the vehicle is running at the predetermined speed or faster, the driver is allowed to recognize in advance that the gearshift operation to the reverse position is invalid.

According to a seventh aspect of the invention, there is provided a vehicle comprising:

an automatic transmission having a plurality of gear ranges;

a gearshift system, comprising:

a plurality of gear selection position which correspond to the respective gear ranges of the automatic transmission;

a gearshift lever being adapted to be positioned at the respective gear selection positions so as to select any one of the gear ranges of the automatic transmission; and a momentary area where the gearshift lever is automatically restored to a home position; and a gear selection position displaying device comprising:

a path display portion which displays a movement path of the gearshift lever;

a lever position display portion which displays the position of the gearshift lever; and a plurality of gear range display portions displaying the respective gear ranges; and a display control unit, wherein when the gear selection position located in the momentary area is selected, the display control unit deletes a display of the selected gear range, which corresponds to the gear selection position located in the momentary area, on the corresponding gear range display portion; and displays the selected gear range on the lever position display portion.

According to an eighth aspect of the invention, there is provided a vehicle as set forth in the seventh aspect of the invention, wherein when there is an invalid gear shift operation which is determined under a predetermined condition, the control unit deleting a display on the gear range display portion, which corresponds to the gear range which is made invalid.

According to a ninth aspect of the invention, there is provided a vehicle as set forth in the eighth aspect of the invention, wherein the gear selection positions include a reverse position where the vehicle travels rearward, the predetermined condition is such that the vehicle is traveling forward at a predetermined speed or faster, and the gear range made invalid is a reverse gear range.

According to the invention, a gear selection position in the gearshift system and a gear range selected in the automatic transmission can be displayed at the same time in an associated fashion, so as to reduce time needed to look at and comprehend what is displayed in the gear selection position displaying device. In addition, according to the invention, the driver is allowed to recognize in advance that the gearshift operation to the reverse position is invalid, the improvement in operability of the gearshift lever for gearshift can be realized.

DETAILED DESCRIPTION OF THE PREFERRED EMBODIMENTS

Hereinafter, embodiments of the invention will be described in detail by reference to the accompanying drawings.

(Gearshift System)

Figure 1:
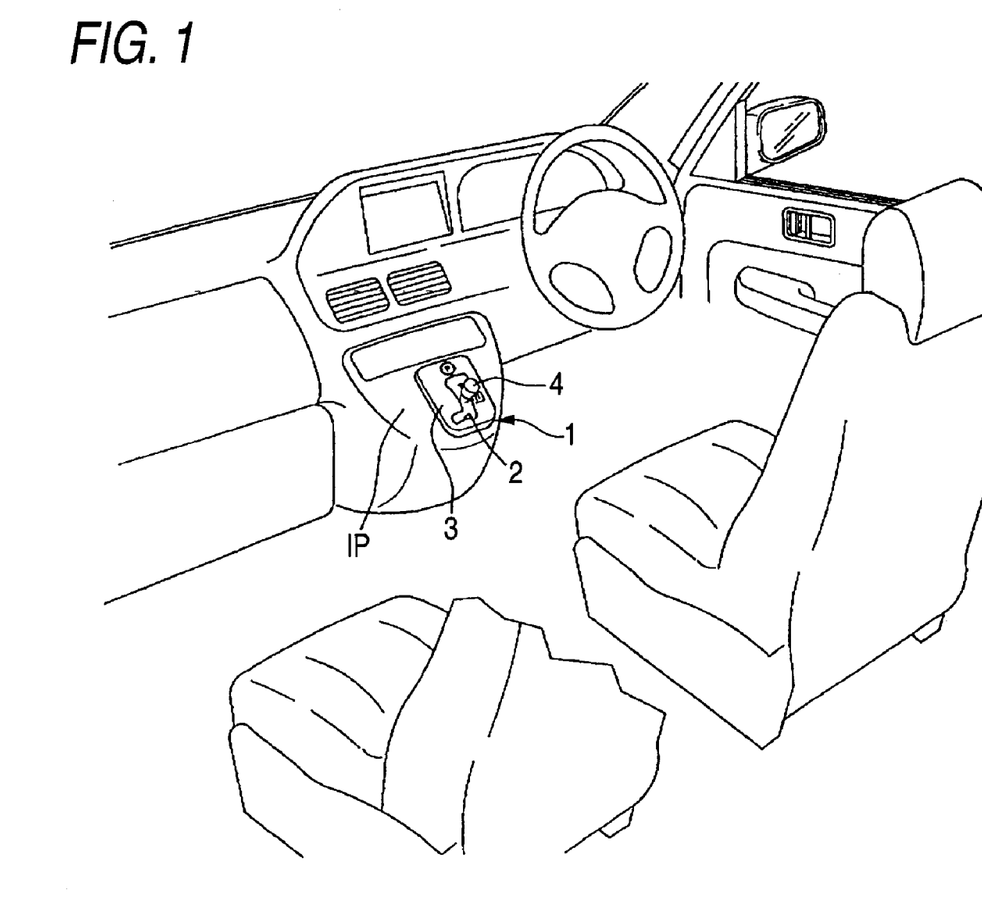
FIG. 1 is a schematic perspective view showing the periphery of an instrument panel on which a gearshift system of an automatic transmission is mounted.

At first, a gearshift system according to an embodiment of the invention will be described. For example, FIG. 1 is a perspective view showing an external appearance of the periphery of an instrument panel on which a gearshift system of the embodiment is mounted, FIG. 2 is a perspective view showing an external appearance of the gearshift system, and FIG. 3 is an explanatory plan view of the gearshift system.

A gearshift system 1 of the embodiment is applied to an automatic transmission, not shown, and transmits a gearshift operation signal Ss to an automatic transmission control unit, not shown, which controls the changeover of gear ranges of the automatic transmission according to a gearshift operation effected by a shift-by-wire method. As shown in FIG. 1, the gearshift system 1 is mounted on a part of an instrument panel IP which lies between a driver's seat and a front passenger's seat of a vehicle. In this embodiment, while a mode is adopted in which an escutcheon cover 3 in which a gate groove 2 is formed is mounted on the instrument panel IP, a mode can also be adopted in which the gate groove 2 is formed in the instrument panel IP itself.

Figure 2:
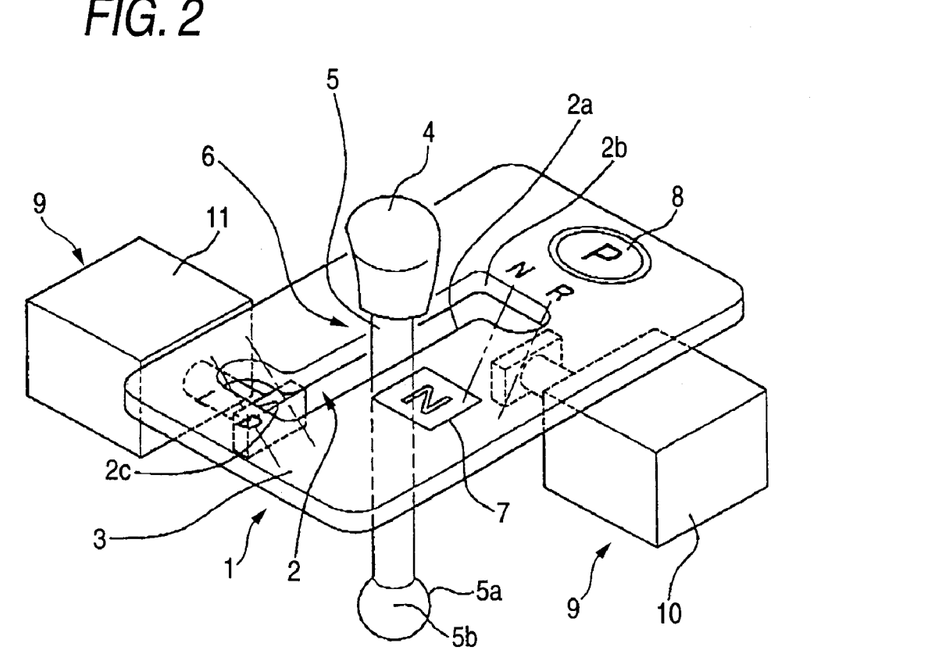
FIG. 2 is a schematic perspective view of the gearshift system of the automatic transmission.
Figure 3:
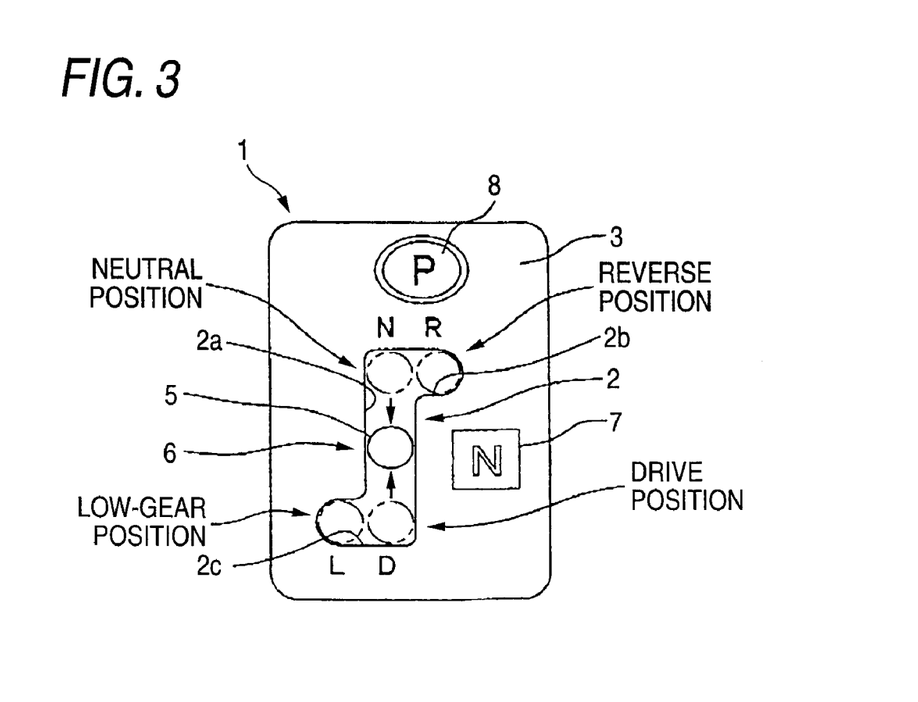
FIG. 3 is an explanatory plan view of the gearshift system of the automatic transmission.

As shown in FIG. 2, a gearshift lever 5 having a gearshift lever knob 4 mounted at an upper end thereof is passed through the gate groove 2. A pivot ball portion 5a, which is formed into a spherical shape, is formed at a distal end of the gearshift lever 5, so as to be supported by a spherical bearing, not shown, in such a manner as to rotate about a pivot center 5b in three dimensions. The gate groove 2 is made up of a first gate groove 2a which extends along a longitudinal direction of the vehicle, a second gate groove 2b which is formed so as to be bent from a front end of the first gate groove 2a towards one side (in this embodiment, a right side), and a third gate groove 2c which is formed so as to be bent from a rear end of the first gate groove 2a towards the other side (in this embodiment, a left side).

Symbols "R", "N", "D" and "L", which denote, respectively, reverse gear range, neutral gear range, drive gear range and low-gear range which are set in the automatic transmission, are given by the gate groove 2 on the escutcheon cover 3. Note that these symbols can be provided on a head portion of the gearshift lever knob 4. As is seen from FIG. 3, a gear selection position pattern is such that: A neutral position, which corresponds to the neutral gear range, lies at a front end portion of the first gate groove 2a. A drive position, which corresponds to the drive gear range, lies at a rear end portion of the first gate groove 2a. A reverse position, which corresponds to the reverse gear range, lies at right end portion of the second gate groove 2b. And a low-gear position, which corresponds to the low-gear gear range, lies at a left end portion of the third gate groove 2c. A home position 6 of the gearshift lever 5 lies at a central portion of the first gate groove 2a.

When classified by operation modes of the gearshift lever 5, the gear selection positions are divided into a momentary area and a holding area. The momentary area is an area where the gearshift lever 5 is automatically restored to the home position 6 by virtue of the biasing force of a spring or the like, not shown, when the drive removes his or her hand therefrom. The holding area is an area where the gearshift lever 5 is held as positioned therein by means of a locking mechanism, not shown, even when the driver removes his or her hand therefrom. In the gearshift system 1 of this embodiment the neutral position and the drive position constitute the momentary area, and the reverse position and the low-gear position constitute the holding area. In addition, a display portion 7 is provided on the escutcheon cover 3 which highlight with emitted light the symbol denoting the currently selected gear range. The formation of this display portion 7 is now limited to the escutcheon cover 3, and hence, the display portion 7 may be formed on part of the instrument panel which lies in the vicinity of the gearshift system 1. Furthermore, the display portion 7 may be formed on a portion apart from the gearshift system 1, that is, the display portion 7 may be formed on a steering wheel or the like.

Instead of applying the momentary area to all the gear selection positions so as to return the gearshift lever 5 to the home position 6 at all times, as with this embodiment, by applying the holding area to part of the gear selection positions such as, in particular, the reverse position and the low-gear position, the drive is allowed to recognize that the gear range currently selected in the automatic transmission is the reverse gear range or the low-gear range through the sensation of the hand, whereby the driver can make a quick decision on the operation of the gearshift lever 5 when parking the vehicle longitudinally along the road side or driving it on a slope.

Furthermore, in the gearshift system 1 of this embodiment, when the gearshift lever 5 is shifted to the neutral position, the drive position, the reverse position or the low-gear position, a gearshift operation signal Ss according to the position of the gearshift lever 5 so shifted can be outputted by a position switch or the like, not shown, whereby the gearshift system 1 functions as a shift-by-wire type gearshift system 1.

In addition, when the driver shifts the gearshift lever 5 into the reverse position without applying the brakes with the gear range of the automatic transmission being in the parking gear range or the driver shifts the gearshift lever 5 into the reverse position while the vehicle is running at a predetermined speed or faster, while the gearshift lever 5 itself is shifted into the reverse position, there may occur a case where the automatic transmission control unit, which controls the changeover of the gear ranges of the automatic transmission, determines invalid the operation by the driver and actually prohibits the intended changeover of the gear ranges of the automatic transmission.

Then, in the gearshift system 1 of the embodiment, in order to prevent the occurrence of a discrepancy between the gear selection position into which the gearshift lever 5 is shifted and the gear range actually selected in the automatic transmission, restoring units 9 are provided which return the gearshift lever 5, which is held in the holding area, to the momentary area so that the gearshift lever 5 is restored to the home position 6.

As shown in FIG. 2, the restoring units 9 of the embodiment push the gearshift lever 5 when it is held in the reverse position and the low-gear position to the neutral position and the drive position by solenoids (10, 11), respectively, according to a restoration signal outputted from the automatic transmission control unit or the like. Then, the gearshift lever 5 is restored to the home position 6 by respective momentary mechanisms (not shown) provided the neutral position and the drive position.

Next, gear selection position displaying devices applied to the gearshift system 1 will be described below by reference to two embodiments of the invention.

First Embodiment

Figure 4:
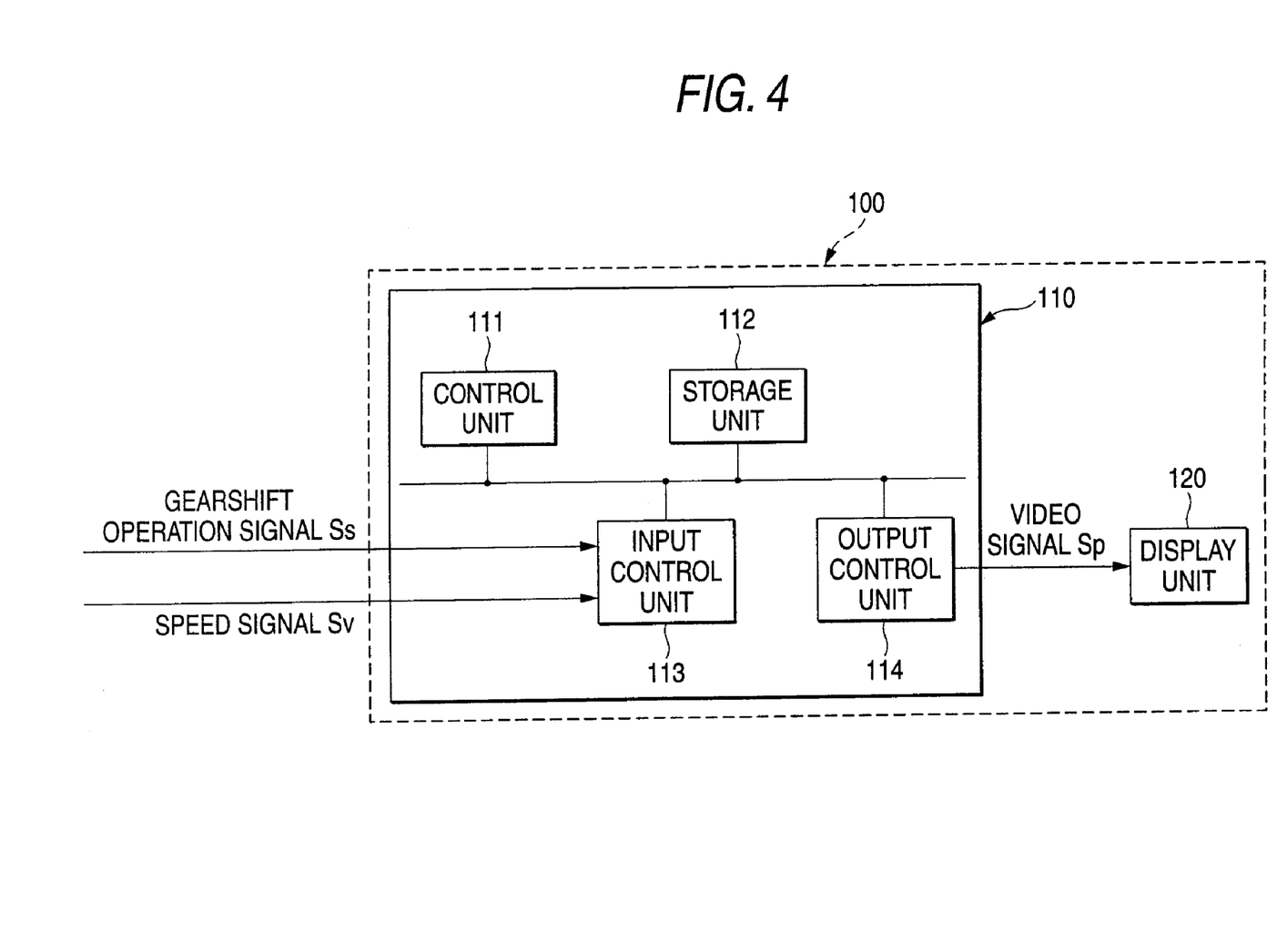
FIG. 4 is a block diagram showing the configuration of a gear selection position displaying device.

For example, FIG. 4 is a block diagram which shows the configuration of a gear selection position displaying device according to a first embodiment of the invention. As shown in FIG. 4, a gear selection position displaying device 100 of the embodiment is made up mainly of a display preparation unit 110 and a display unit 120.

The display preparation unit 110 is configured so as to include a control unit 111 which controls the display preparation unit 110 in a supervisory fashion, a storage unit 112, an input control unit 113 and an output control unit 114.

The storage unit 112 temporarily stores a signal inputted from an input control unit 113 and a video signal Sp generated by the control unit 111 and also stores part information making up a gear selection position display screen and codes for operating the control unit 111.

The input control unit 113 is an input interface for a gearshift operation signal Ss and a speed signal Sv. Wherein the gearshift operation signal Ss is transmitted from the gearshift system 1 and corresponds to a gear selection position into which the gearshift lever 5 is shifted. The speed signal Sv is sent from a speed detecting unit, not shown, for detecting a vehicle speed.

The output control unit 114 functions as an output interface for outputting a video signal Sp generated by the control unit 110 to a display unit 120.

The display unit 120 is a display device for displaying a display screen, which will be described later on.

The display preparation unit 110 is realized by making a computer which includes a CPU (Central Processing Unit) which corresponds to the control unit 111, a RAM (Random Access Memory) 112 which corresponds to the storage unit 112, an input/output interface, and the like execute an exclusive code. Consequently, the display preparation unit 110 can also be realized by having the exclusive code executed within a computer which makes up the automatic transmission control unit which changes over the gear ranges of the automatic transmission.

In addition, the display unit 120 can be disposed within an instrument cluster, on the instrument panel or other various places inside the vehicle and may be provided in a plural number.

Next, a gear selection position display screen, which is displayed on the display unit 120 of the gear selection position displaying device 100 and on which a current gear selection position and a gear range currently selected in the automatic transmission are displayed, will be described in detail in relation to the operation of the display preparation unit 110.

Figure 5:
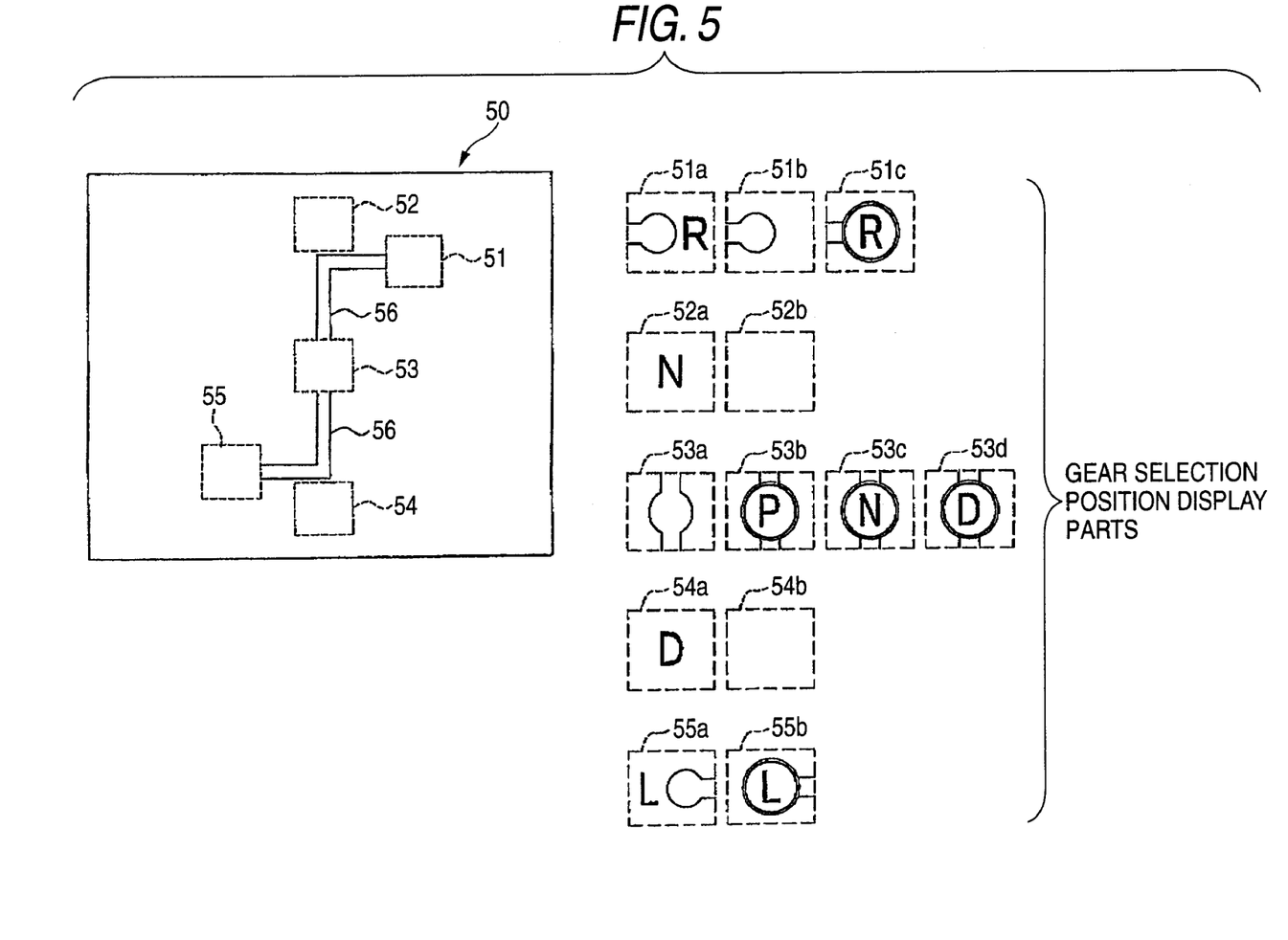
FIG. 5 is an explanatory drawing explaining information making up a display screen stored in a storage unit.

Here, FIG. 5 is a drawing which explains parts information which is stored in the storage unit 112 of the display preparation unit 110 shown in FIG. 4 to making up a gear selection position display screen. Stored in the storage unit 112 are, as shown in FIG. 5, a gear selection position display pattern 50 which constitutes abase for a gear selection position display screen and gear selection position display parts (51a to 55b) which are to be combined with the gear selection position display pattern 50.

In the gear selection position display pattern 50, a gearshift lever moving path 56 which corresponds to the gate groove 2 is displayed in such a manner as to correspond to the gearshift lever shifting pattern shown in FIG. 3. An area denoted by reference numeral 51 which corresponds to the reverse position where the gearshift lever 5 is held; an area denoted by reference numeral 55 which corresponds to the low-gear position; an area denoted by reference numeral 53 which corresponds to the home position 6 to which the gearshift lever 5 is returned by virtue of the momentary function; an area denoted by reference numeral 52 to which a display showing the neutral position is to be imparted; and an area denoted by reference numeral 54 to which a display showing the drive position is to be imparted are prepared so as to be replaced by the gear selection position display parts (51a to 55b).

Note that the gearshift lever moving path 56 corresponds to the path display portion in the claim of the invention.

A predetermined combination of the gear selection position display parts (51a to 55b) is selected in the control unit 111 according to a gearshift operation signal Ss that is transmitted from the gearshift system 1 so as to be compounded with the gear selection position display pattern 50. Then, the compound is outputted from the output control unit 114 to the display unit 120 as a video signal Sp for the gear selection position display screen.

Among the gear selection position display parts (51a to 5b), "R" denoting the reverse position, "D" denoting the drive position and "L" denoting the low-gear position constitute gear selection positions which involve the movement of the vehicle, whereas "P" denoting the park position and "N" denoting the neutral position constitute gear selection positions which enable the start of an engine of the vehicle. Therefore, those two groups of gear selection positions are preferably displayed indifferent colors (for example, "R", "D" and "L" are displayed in blue, whereas "P" and "N" are displayed in red).

In addition, among the gear selection position display parts (51a to 55b), circled portions in the gear selection position display areas denoted by reference numeral 51c, reference numeral 53b, reference numeral 53c, reference numeral 53d, and reference numeral 55b indicate the position of the gearshift lever 5 and correspond to the lever position display portion. Furthermore, the gear selection position display areas (51a, 52a, 53a, 54a, 55a, and symbol portions on the display areas denoted by reference numerals 51c, 53b, 53c, 53d and 55b) on which symbols indicating gear ranges that are selected at the gear selection positions, respectively, correspond to the gear range display portion.

Here, an example of a combination table is shown in Table 1 below which records predetermined combinations of the gear selection position display parts (51a to 55b) which are triggered according to a gearshift operation signal Ss. As shown in Table 1, combinations of the gear selection position display parts (51a to 55b) which are to be compounded with the gear selection position display pattern 50 are determined individually according to the gear selection positions including a "Drive position", "Neutral position", "Reverse position", "Drive position (1)", "Drive position (2)" and "Low-gear position." In addition, the combination table shown in FIG. 1 is stored in the storage unit 112 in advance, and the control unit 111 prepares a gear selection position display screen which corresponds to each of the gear selection positions by reference to the combination table so stored.

In addition, in the combination table shown in Table 1, the difference between the "drive gear range (1)" and "drive gear range (2)" will be described later on.

TABLE 1

A Combination table of gear selection position display parts according to gearshift operation signals

| Gear selection position; | Gear selection position display part numbers; | | | | |
|---|---|---|---|---|---|
| Park position; | 51a | 52a | 53b | 54a | 55a |
| Neutral position; | 51a | 52b | 53c | 54a | 55a |
| Reverse position; | 51c | 52a | 53a | 54a | 55a |
| Drive position (1); | 51a | 52a | 53d | 54b | 55a |
| Drive position (2); | 51b | 52a | 53d | 54b | 55a |
| Low-gear position | 51a | 52a | 53a | 54a | 55b |

Next, a gear selection position display screen which is displayed on the display unit 120 of the gear selection position displaying device 100 by the control unit 111 will be described based on the information which makes up the gear selection position display screen and the combination table shown in Table 1 (refer to FIGS. 3, 4 appropriately).

Figure 6A:
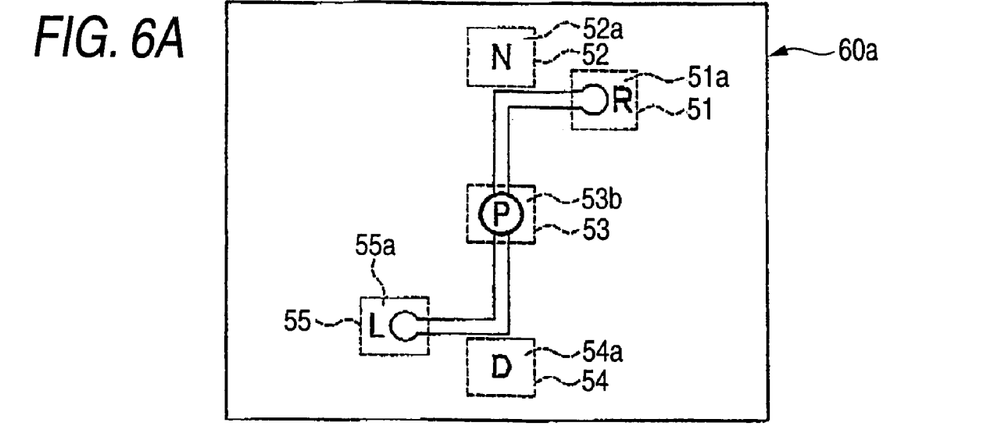
FIG. 6A is a drawing which shows gear selection position display screens on a display unit when in a park gear range.
Figure 6B:
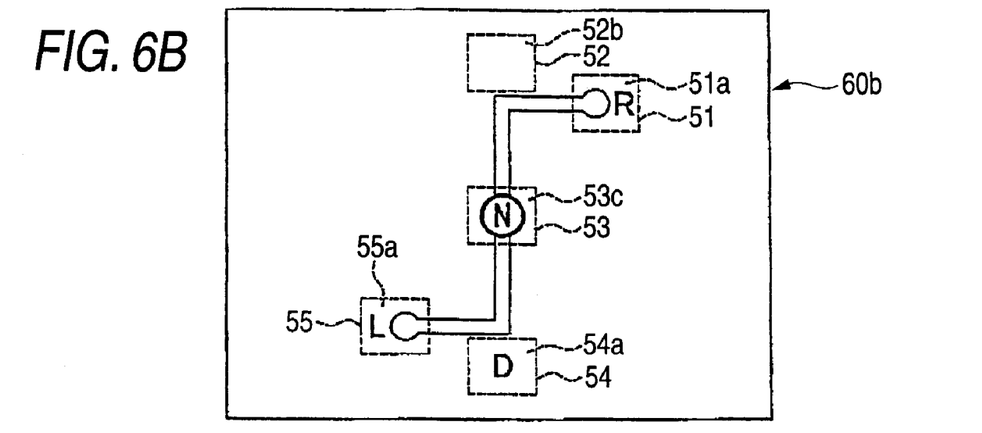
FIG. 6B is a drawing which shows gear selection position display screens on a display unit when in a neutral gear range.
Figure 6C:
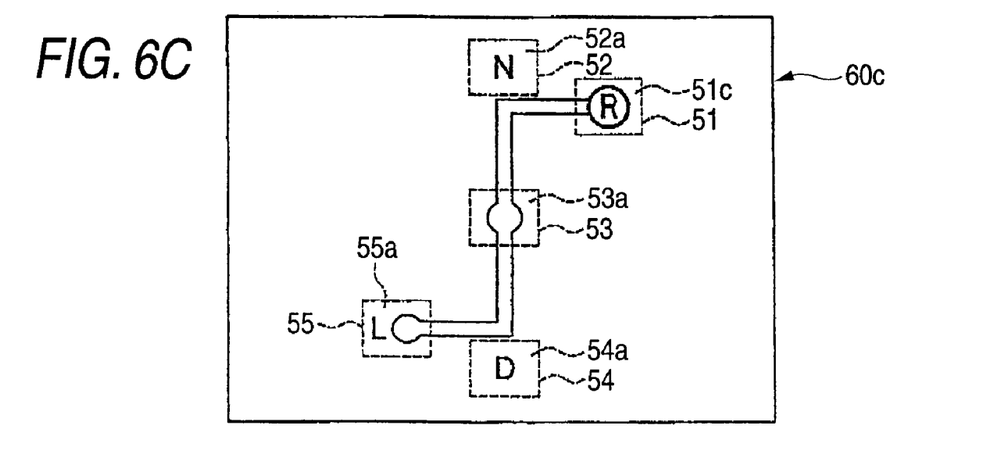
FIG. 6C is a drawing which shows gear selection position display screens on a display unit when in a reverse gear range.
Figure 7A:
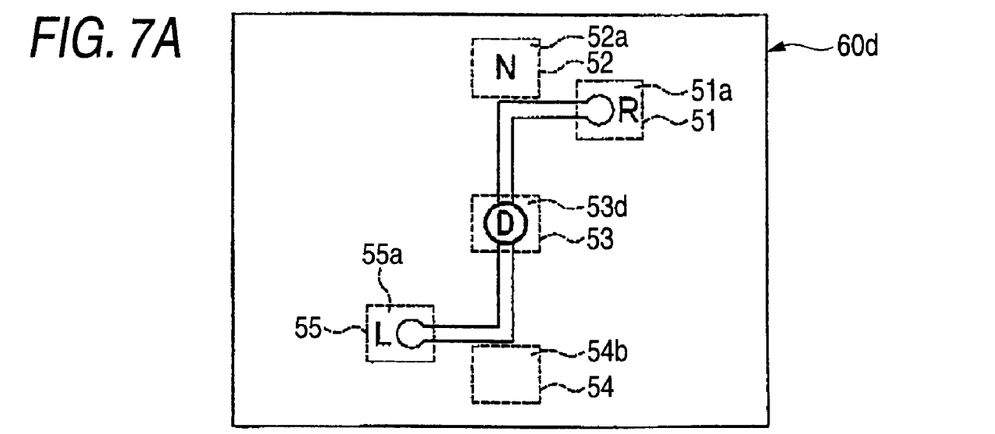
FIG. 7A is a drawing which shows gear selection position display screens on a display unit when in a drive gear range.
Figure 7B:
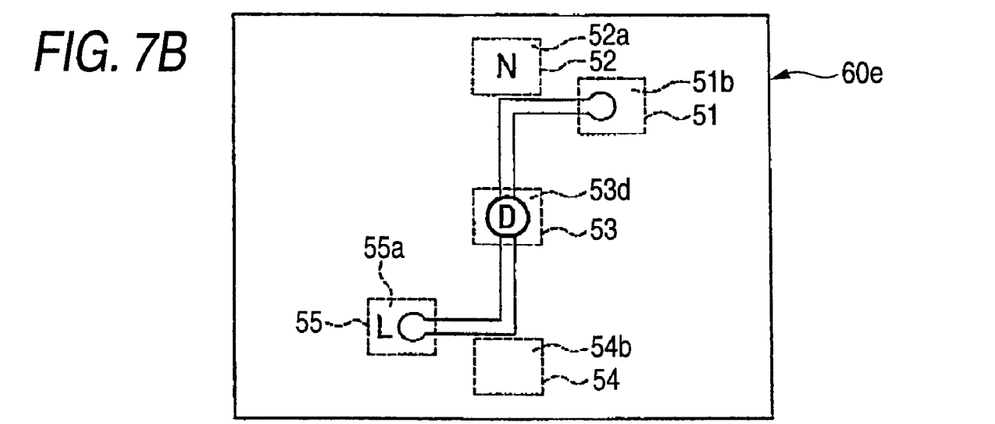
FIG. 7B is a drawing which shows gear selection position display screens on a display unit when in the drive gear range with a vehicle running at a predetermined speed or faster.
Figure 7C:
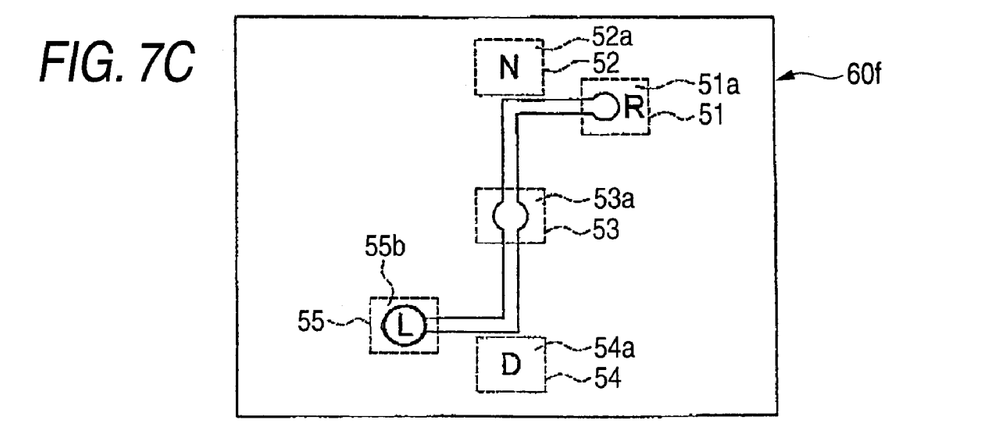
FIG. 7C is a drawing which shows gear selection position display screens on a display unit when in a low-gear gear range.

For example, FIGS. 6 and 7 are drawings showing gear selection position display screens which are displayed on the display unit 120 in the individual gear selection positions. FIG. 6A shows a gear selection position display screen resulting when the gear selection position is in the park position. FIG. 6B a gear selection position display screen resulting when the gear selection position is in the neutral position. FIG. 6C a gear selection position display screen resulting when the gear selection position is in the reverse position. FIGS. 7A and 7B gear selection position display screens resulting when the gear selection position is in the drive position. FIG. 7C a gear selection position display screen resulting when the gear selection position is in the low-gear position. Hereinafter, the gear selection position display screens (60a to 60f) will be described individually.

Firstly, when the gear selection position is in the park position, in the gearshift system 1, there occurs a state in which the gearshift lever 5 is in the home position 6 and the park switch 8 is selected. As this occurs, in the gear selection position display screen 60a shown in FIG. 6A, the gear selection position display part 53b, in which the symbol "P" denoting the park position is shown in the circle denoting the position of the gearshift lever 5, is compounded with the area denoted by reference numeral 53 which corresponds to the home position 6.

When the gear selection position is in the neutral position, in the gearshift system 1 shown in FIG. 3, the gearshift lever 5 is in the home position 6, and in the gear selection position display screen 60b shown in FIG. 6B, the gear selection position display part 53c, in which the symbol "N" denoting the neutral position is shown in the circle denoting the position of the gearshift lever 5, is compounded with the area denoted by reference numeral 53 which corresponds to the home position 6. Additionally, since the current gear selection position is in the neutral position, an operation is invalid in which the gearshift lever 5 is operated to select the neutral position in the gearshift system 1. Therefore, the driver is informed that the relevant operation is invalid by compounding the gear selection position display part 52b in which the display of "N" is deleted with the area denoted by reference numeral 52.

When the gear selection position is in the reverse position, in the gearshift system 1, the gearshift lever 5 is held in the reverse position, and in the gear selection position display screen 60c shown in FIG. 6C, the gear selection position display part 51c, in which the symbol "R" denoting the reverse position is shown in the circle denoting the position of the gearshift lever 5, is compounded with the area denoted by reference numeral 51 which corresponds to the reverse position. According to this gear selection position display part 51c, not only is the gear selection position displayed but also the driver cannot effect an operation to shift the gearshift lever 5 for selection of the reverse position due to the gearshift lever 5 being held in the reverse position. Therefore, the display is provided in which the character "R" lying on a right side of the reverse position is deleted (refer to the gear selection position display part 51a) so that the driver is allowed to recognize that the relevant operation is invalid.

Next, in the gear selection position displaying device 100 of the embodiment, when the gear selection position is in the drive position, either of the two gear selection position display screens (60c, 60d) is displayed on the display unit 120. This is because in this embodiment, when the gear range of the automatic transmission is in the drive gear range, in the event that the vehicle runs at a predetermined speed or faster (for example, 5 km/h), the automatic transmission control unit controls such that a gear range change from the drive gear range to the reverse gear range is made invalid, and the driver needs to be so informed.

Due to this, the control unit shown in FIG. 4 obtains from the input control unit 113 a speed signal Sv according to the speed of the vehicle which has been transmitted from the speed detecting unit, not shown, and controls such that the gear selection position display screen 60d shown in FIG. 7A is displayed in the event that the speed of the vehicle is slower than 5 km/h, whereas the control unit 111 controls such that the gear selection position display screen 60d shown in FIG. 7B is displayed in the event that the speed of the vehicle is 5 km/h or faster.

In the gear selection position display screen 60d shown in FIG. 7A, the gear selection position display part 53d, in which the symbol "D" denoting the drive position is shown in the circle denoting the position of the gearshift lever 5, is compounded with the area denoted by reference numeral 53 which corresponds to the home position 6. Since the current gear selection position is in the drive position, in the gearshift system 1, an operation is made invalid in which the gearshift lever 5 is operated to select the drive position, and therefore, the gear selection position display part 54*b*, in which the symbol "D" is deleted, is compounded with the area denoted by reference numeral 54 so that the driver is informed that the relevant operation is invalid. Furthermore, in the gear selection position display screen 60*e* shown in FIG. 7B, the display is provided in which the character "R" lying on the right side of the reverse position is deleted (refer to the gear selection position display part 51*a*) so that the driver is allowed to recognize that shifting the gearshift lever 5 into the reverse position is invalid.

When the gear selection position is in the low-gear position, in the gearshift system 1, the gearshift lever 5 is held in the low-gear position, and in the gear selection position display screen 60*f* shown in FIG. 7C, the gear selection position display part 55*b*, in which the symbol "L" denoting the low-gear position is shown in the circle denoting the position of the gearshift lever 5, is compounded with the area denoted by reference numeral 55 which corresponds to the low-gear position. According to this gear selection position display part 55*b*, not only is the gear selection position displayed but also the driver cannot effect an operation to shift the gearshift lever 5 for selection of the low-gear position due to the gearshift lever 5 being held in the low-gear position Therefore, the display is provided in which the character "L" lying on a left side of the low-gear position is deleted (refer to the gear selection position display part 55*a*) so that the driver is allowed to recognize that the relevant operation is invalid.

Additionally, for example, with the vehicle running at the predetermined speed or faster in the drive gear range, when the automatic transmission control unit controls such that the gear range is not changed over to the low gear range, a gear selection position display screen or part in which the symbol "L" is deleted to match this condition can be compounded. Thus, in the event that there is a gearshift operation which is determined as invalid by the vehicle side under a predetermined condition, a gear selection position display screen, in which the symbol corresponding to the gearshift that is determined invalid is deleted, can be prepared appropriately, so that the display preparation unit 110 can output the gear selection position display screen so prepared to match the predetermined condition to the display unit 120.

Thus, according to the gear selection position displaying device of the embodiment, the gear selection position in the gearshift system and the gear range in the automatic transmission can be displayed at the same time and in a related fashion.

In addition, by deleting the display of the gear selection position at which the gearshift operation that is determined as invalid, the driver is allowed to be informed in advance of the gearshift operation which triggers the gear range change that is made invalid by the automatic transmission control unit.

Furthermore, as with the embodiment, by producing the gear selection position display screen by combining the gear selection position display pattern with the gear selection position display parts, a narrow storage area is allowed to deal with various display screens such as the gear selection position display screen in which the character "L" denoting the low-gear position is deleted in the event that the vehicle is running at the predetermined speed or faster.

Second Embodiment

Next, a gear selection position displaying device according to a second embodiment will be described in detail. The gear selection position displaying device of the second embodiment has the same configuration as that of the gear selection position displaying device 100 of the first embodiment shown in FIG. 4, and display screens shown on a display unit 120 are the same as those shown in FIGS. 6 and 7. Consequently, like reference numerals are imparted to like constituent members, and the description thereof will be omitted.

Note that, the information shown in FIG. 5 as making up the gear selection position display screen and the combination table shown in Table 1 are not stored in a storage unit 112 of a gear selection position displaying unit 100 of this embodiment. In stead, the gear selection position display screens (60*a* to 60*f*) shown in FIGS. 6 and 7 are stored therein. Consequently, a control unit 111 selects the gear selection position display screens (60*a* to 60*f*) corresponding to the gear selection positions, respectively, from the storage unit 112 based on a gearshift operation signal Ss and a vehicle speed signal Sv. Then, the control unit 11 outputs the gear selection position display screens (60*a* to 60*f*) so selected from an output control unit 114 to the display unit 120 as a video signal Sp.

In this embodiment, the gear selection position display screens (60*a* to 60*f*) correspond to the gear selection position display.

Similar to the first embodiment, in the event that there is a gearshift operation that is determined invalid by the vehicle side under a predetermined condition, a gear selection position display screen, in which a display corresponding to the gearshift operation that is determined invalid is not shown, can be stored in the storage unit. Then, a display preparation unit can output appropriately the gear selection position display screen so stored to the display unit when the predetermined condition is met.

According to the gear selection position displaying device of the embodiment, as with the gear selection position displaying device described in the first embodiment, the gear selection position in the gearshift system and the gear range in the automatic transmission can be displayed at the same time. Without making the driver feel a sensation of physical disorder, and by deleting the display of the gear selection position at which the gearshift operation that is determined as invalid, the driver is allowed to be informed in advance of the gearshift operation which triggers the gear range change that is made invalid by the automatic transmission control unit.

Furthermore, as with this embodiment, by storing the information on the gear selection position screens according to the gear selection positions in the storage unit in advance, when compared to the first embodiment, the process of compounding images can be omitted, and hence, the operation of the control unit of the display preparation unit can be simplified.

While the preferred embodiments of the invention have been described heretofore, the invention is not limited to those embodiments but can be embodied variously.

For example, the gearshift lever shifting pattern in the gearshift system shown in the embodiments is such as to be illustrated for explanation Therefore, the invention can be applied to gearshift systems having various shift lever shifting patterns such as a gearshift system to which a manual mode is applied in which a desired gear can be selected through the gearshift operation by the driver.

For example, in a vehicle equipped with an automatic transmission having the manual mode, a configuration may be adopted in which when the manual mode is selected, a numeral denoting a gear range currently selected in the automatic transmission is displayed within the circle denoting the position of the gearshift lever 5 in the area denoted by reference numeral 53 which corresponds to the home position 6. In this case, by displaying the symbol "D" in the area denoted by reference numeral 54, the gear selection position in the gearshift system and the gear range in the automatic transmission can be displayed at the same time in a related fashion.

Further, in the embodiments that have been described above, while the gearshift operation signal Ss is described as being inputted into the display preparation unit from the gearshift system, the invention can also be embodied by replacing the gearshift operation signal Ss by a gear range position signal Sr which is a signal denoting a gear range currently selected in the automatic transmission which is sent from the automatic transmission main body or the automatic transmission control unit which controls the changeover of the gear ranges of the automatic transmission.

Additionally, in the embodiments that have been described above, while the display preparation unit can be realized by making the computer executing the exclusive code, the display preparation unit can be replaced by an exclusive logic device which performs the similar operation to that of the display preparation unit.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A gear selection position displaying device for a gearshift system which selects any one of a plurality of gear ranges set in an automatic transmission by positioning a gearshift lever at respective gear selection positions and comprises a momentary area where the gearshift lever is automatically restored to a home position, the gear selection position displaying device comprising:
   a path display portion which displays a movement path of the gearshift lever;
   a lever position display portion which displays the position of the gearshift lever; and
   a plurality of gear range display portions displaying the respective gear ranges which are selected when the gear shift lever is positioned at the corresponding gear selection positions, respectively,
   wherein when the gear selection position located in the momentary area is selected, a display of the selected gear range, which corresponds to the gear selection position located in the momentary area, on the corresponding gear range display portion is deleted, and the selected gear range is displayed on the lever position.

2. The gear selection position displaying device as set forth in claim 1, wherein
   when there is an invalid gear shift operation which is determined under a predetermined condition,
   a display on the gear range display portion, which corresponds to the gear range which is made invalid, is deleted.

3. A gear selection position displaying device for a gearshift system which selects any one of a plurality of gear ranges set in an automatic transmission by positioning a gearshift lever at respective gear selection positions and comprises a momentary area where the gearshift lever is automatically restored to a home position,
   the gear selection position displaying device memorizing a plurality of gear selection position displays which correspond to the respective gear selection positions, and displaying one of the gear selection position displays which corresponds to the gear selection position which the driver has selected by the gearshift lever, wherein the plurality of the gear selection position displays comprising:
   a path display portion which displays a movement path of the gearshift lever;
   a lever position display portion which displays the position of the gearshift lever; and
   a plurality of gear range display portions displaying the respective gear ranges which are selected when the gear shift lever is positioned at the corresponding gear selection positions, respectively,
   wherein when the gear selection position located in the momentary area is selected, a display of the selected gear range, which corresponds to the gear selection position located in the momentary area, on the corresponding gear range display portion is deleted, and the selected gear range is displayed on the lever position.

4. The gear selection position displaying device as set forth in claim 3, wherein
   when there is an invalid gear shift operation which is determined under a predetermined condition,
   a display on the gear range display portion, which corresponds to the gear range which is made invalid, is deleted.

5. The gear selection position displaying device as set forth in claim 2, wherein the gear selection positions include a reverse position where the vehicle travels rearward,
   the predetermined condition is such that the vehicle is traveling forward at a predetermined speed or faster, and
   the gear range made invalid is a reverse gear range.

6. The gear selection position displaying device as set forth in claim 4, wherein the gear selection positions include a reverse position where the vehicle travels rearward,
   the predetermined condition is such that the vehicle is traveling forward at a predetermined speed or faster, and
   the gear range made invalid is a reverse gear range.

7. A vehicle comprising:
   an automatic transmission having a plurality of gear ranges;
   a gearshift system, comprising:
      a plurality of gear selection position which correspond to the respective gear ranges of the automatic transmission;
      a gearshift lever being adapted to be positioned at the respective gear selection positions so as to select any one of the gear ranges of the automatic transmission; and
      a momentary area where the gearshift lever is automatically restored to a home position; and
   a gear selection position displaying device comprising:
      a path display portion which displays a movement path of the gearshift lever;
      a lever position display portion which displays the position of the gearshift lever; and
      a plurality of gear range display portions displaying the respective gear ranges; and
      a display control unit,
   wherein when the gear selection position located in the momentary area is selected,
   the display control unit deletes a display of the selected gear range, which corresponds to the gear selection position located in the momentary area, on the corresponding gear range display portion; and displays the selected gear range on the lever position display portion.

8. The vehicle as set forth in claim 7, wherein when there is an invalid gear shift operation which is determined under a predetermined condition, the control unit deleting a display on the gear range display portion, which corresponds to the gear range which is made invalid.

9. The vehicle as set forth in claim 8, wherein the gear selection positions include a reverse position where the vehicle travels rearward, the predetermined condition is such that the vehicle is traveling forward at a predetermined speed or faster, and the gear range made invalid is a reverse gear range.

* * * * *